(12) United States Patent
Droms et al.

(10) Patent No.: US 7,941,512 B2
(45) Date of Patent: May 10, 2011

(54) USE OF IPV6 IN ACCESS NETWORKS

(75) Inventors: Ralph E. Droms, Westford, MA (US); Madhu Sudan, San Jose, CA (US); Sanjeev Hemantkumar Desai, Saratoga, CA (US); John T. Chapman, Saratoga, CA (US); Raman S. Krishnan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1322 days.

(21) Appl. No.: 11/302,966

(22) Filed: Dec. 13, 2005

(65) Prior Publication Data

US 2006/0159100 A1 Jul. 20, 2006

Related U.S. Application Data

(60) Provisional application No. 60/635,995, filed on Dec. 13, 2004.

(51) Int. Cl.
*G06F 15/177* (2006.01)
(52) U.S. Cl. ........................................ 709/222
(58) Field of Classification Search .................. 709/222
See application file for complete search history.

(56) References Cited

U.S. PATENT DOCUMENTS

| | | | |
|---|---|---|---|
| 2002/0078188 A1* | 6/2002 | Anand et al. | 709/222 |
| 2003/0106067 A1* | 6/2003 | Hoskins et al. | 725/119 |
| 2004/0131079 A1* | 7/2004 | Hegde et al. | 370/466 |
| 2004/0179539 A1* | 9/2004 | Takeda et al. | 370/401 |
| 2005/0078824 A1* | 4/2005 | Malinen et al. | 380/247 |

OTHER PUBLICATIONS

Thesaurus.com, "register," in Roget's 21st Century Thesaurus, Third Edition. Source location: Philip Lief Group 2009. http://www.thesaurus.com/browse/register. Available: http://www.thesaurus.com. Accessed: May 20, 2010.*

* cited by examiner

*Primary Examiner* — Kevin Bates
*Assistant Examiner* — Angela Nguyen
(74) *Attorney, Agent, or Firm* — Marger Johnson & McCollom, P.C.

(57) ABSTRACT

An embodiment method may comprise establishing a link layer connection to an access server, obtaining a management address, wherein the management address is at least one of an IPv6 and an IPv4 address, obtaining a TFTP server address, wherein the server address is either IPv6 or IPv4, downloading a configuration file from the TFTP server, registering with the access server as IPv6 capable, maintaining an IP address/prefix-MAC mapping database, and determining whether the IPv6 address belongs to a particular media access control (MAC) address based on the IP address/prefix-MAC mapping database.

20 Claims, 9 Drawing Sheets

FIG. 5

USE OF IPV6 IN ACCESS NETWORKS

RELATED APPLICATIONS

This application claims priority of U.S. provisional patent application Ser. No. 60/635,995, filed Dec. 13, 2004, titled ADVANCED DATA OVER CABLE SERVICE INTERFACE SPECIFICATION (DOCSIS) SYSTEM, which is incorporated herein by reference.

BACKGROUND

The continuous growth of the global Internet requires that its overall architecture evolve to accommodate the new technologies that support the growing numbers of users, applications, appliances, and services. The current internet protocol (IP) address space is unable to satisfy the potential huge increase in the number of users or the geographical needs of the Internet expansion, let alone the requirements of emerging applications such as Internet-enabled wireless digital assistants, home and industrial appliances, Internet-connected transportations, integrated telephony services, and distributed computing or gaming.

The lifetime of IPv4 has been extended using techniques such as address reuse with network address translation (NAT) and temporary-use allocations. While providing some relief, these techniques present applications such as peer-to-peer communication with severe constraints. More importantly, they are becoming insufficient in addressing even the basic needs for some service providers such as multiple systems operators (MSOs).

In multiple cases, the number of managed devices, coupled with operational efficiency losses and business partner needs, already exceed the reusable address space available in IP version 4 (IPv4). Always-on environments such as residential Internet through cable modem, digital subscriber line (DSL), or Ethernet-to-the-home (ETTH), require long lasting assignments which limit the effectiveness of pooling and other temporary allocation techniques. The direct peer interaction applications, coupled with the ready-to-use capability required by consumer Internet appliances, preclude NAT techniques.

Each of these evolutions in the demand for and use of Internet services further increases the overall address requirements on the global Internet. IPv6 has the address resources to answer the increasing demand and provide a global address to all devices that require it. In RFC 3513, IP Version 6 (IPv6) Addressing Architecture In IPv6, the number of network address bits increases from 32 bits (in IPv4) to 128 bits, which provides plenty of globally unique IP addresses for the foreseeable future. The availability of global addresses can also lead to a more transparent and homogeneous Internet.

Along with these opportunities come challenges as well. The introduction of IPv6 is an intrusive endeavor. The current accounting and management systems do not directly support the new protocol and new service needs. Additionally, the network infrastructure does not adequately handle the requirements of running the IPv4 and IPv6 protocols simultaneously. For example, services such as VoIP have been very successful for cable providers and it is important that their performance and operation is not affected by the coexistence of the two versions of IP. A stable migration path to ensure the successful introduction of this extensible feature rich protocol is paramount.

SUMMARY

An embodiment method may comprise establishing a link layer connection to an access server, obtaining a management address, wherein the management address is at least one of an IPv6 and an IPv4 address, obtaining a TFTP server address, wherein the server address is either IPv6 or IPv4, downloading a configuration file from the TFTP server, and registering with the access server as IPv6 capable.

Another embodiment may be a cable modem termination system (CMTS) comprising a port to receive downstream internet protocol (IP) traffic, a processor in communication with the port, the processor to classify downstream traffic based on fields in IP version 6 (IPv6) headers; and a radio frequency port in communication with the processor, the radio frequency port to send downstream traffic from the CMTS, wherein the processor uses a flow label as the downstream classifier so IP addresses can remain encrypted in the downstream traffic.

Another embodiment method may comprise receiving a ranging request from a cable modem, assigning the cable modem a service identifier, matching the service identifier with a link layer address of the cable modem, receiving a router advertisement and comparing the source link layer address from the router advertisement to the link layer address of the cable modem, and determining that the router advertisement was sent from the cable modem if the link layer address of the cable modem is the same as the source link layer address.

And yet another embodiment may be a system comprising a first local network, a second local network coupled with the first local network, the second local network comprising a home agent, and a wireless device with IP connectivity to the home agent, the wireless device able to move from the first local network to the second local network and maintain IP connectivity with the home agent.

Another example embodiment may be an apparatus comprising a port to communicate over a link layer connection to an access server, and a processor coupled with the port, the processor to communicate through the port with the access server and obtain at least one of an IPv6 or IPv4 management address, the processor further to obtain at least one of an IPv6 or IPv4 TFTP server address from the access server, and the processor to download a configuration file through the port from the TFTP server and register through the port with the access server as IPv6 capable.

An embodiment may be a cable modem termination system (CMTS) comprising a port to receive configuration information from a cable modem, a memory in communication with the port, the memory to store the cable modem configuration information, and a processor in communication with the port and the memory, the processor to access the configuration information, determine at least one cable modem setting, and output the at least one cable modem setting.

BRIEF DESCRIPTION OF THE DRAWINGS

FIG. 5 illustrates an example DHCP sub-option as may be used in an embodiment.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Figure 1:
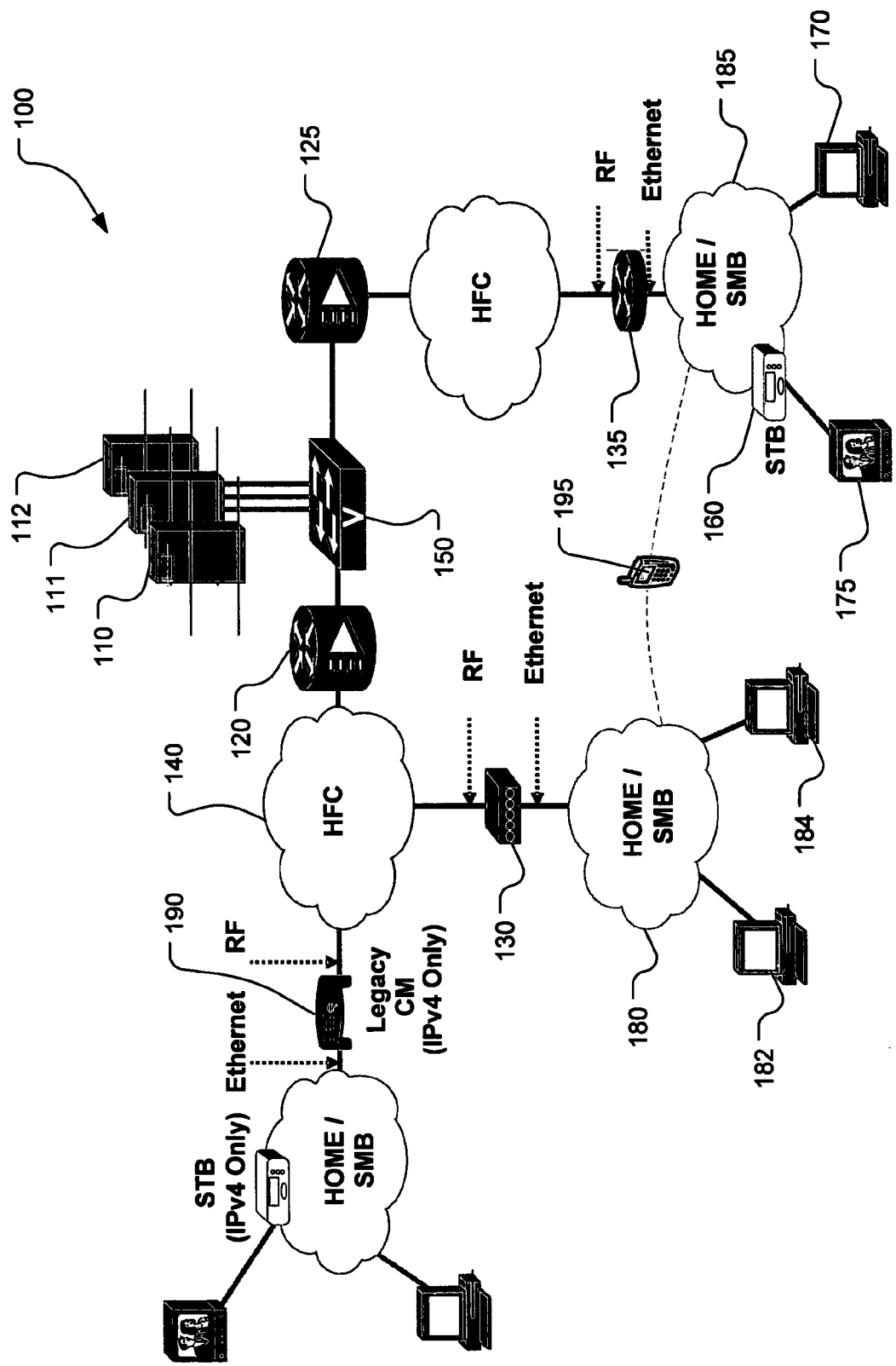
FIG. 1 illustrates an example cable topology of an access network that supports IPv6.

FIG. 1 illustrates an example cable topology 100 of an access network that supports IPv6. In this embodiment topology, servers 110, 111 and 112 are example servers coupled with switch 150. Examples for switch 150 include Cisco Systems Catalyst 3560 and Catalyst 3750 switches. Servers 110, 111 and 112 may include additional servers, or may be combined into the same hardware device.

These servers may include a dynamic host configuration protocol (DHCP) server, a domain name system (DNS) server, a trivial file transfer protocol (TFTP) server, a time of day server (TOD), a web server, a streaming or a video on demand (VOD) server, as examples. In general, these servers provide configuration, controls and information, etc., to devices in topology 100. In the present topology the servers 110, 111 and 112 are coupled with switch 150, but other embodiments may comprise the servers 110, 111 and 112 coupled to other portions of the topology 100, or even coupled with elements not represented in topology 100 but in communication with the elements of topology 100 through a network such as the global Internet.

Referring to the figure, switch 150 is shown in communication with network elements 120 and 125. Examples elements 120 and 125 include universal broadband routers such as uBR10k and uBR7246VXR by Cisco Systems, respectively, switches with similar functionality, etc. In topology 100 networks elements 120 and 125 are cable modem termination systems (CMTS), and provide high speed services such as a cable Internet connection, Voice over IP (VoIP), VOD, etc. Elements 120 and 125 in this description will be referred to as CMTSs for the remainder of this description, but as illustrated may be any network element that provides similar functionality. An example CMTS is referred to below in FIG. 2.

In this embodiment the CMTSs are coupled through a hybrid fiber coaxial network 140 (HFC) to cable modems (CM) 130, 135, 190 that typically reside at end user premises. CMTSs 120 and 125 communicate through the HFC 140 network over a radio frequency (RF) connection to CMs 130, 135, 190. This portion of topology 100 is often referred to as the multiple service operator (MSO) side, and often includes servers 110, 111 and 112. Typically, MSO control includes a CM 130 if the CM 130 is operating as a bridge, and only includes a portion of the CM 135 if it is operating as a router.

Referring to topology 100, CMs 130, 135 and 190 may be coupled through a home or small or medium size business (SMB) network 180 to various consumer premises equipment (CPE) such as personal computer 170, set-top box (STB) 160 and television 175, wireless device, mobile agent or terminal 195, etc.

Access network operators have several requirements for access network operation. For example, a network operator may require the ability to provision tens of thousands of home devices and CMs 130, 135 and 190 attached to a broadband edge router, such as CMTS 120 or CMTS 125, in an automated way with minimal manual intervention. Furthermore, another requirement may be to eliminate network address translation (NAT) to allow assignment of global addresses to all CPEs, therefore enabling deployment of new services that cannot be supported with NAT. Additionally, network operators may need to allow deployment of routers and multiple network links in the customer network, provide mobility services so end users may move between networks, and provide additional multicast and Quality of Service (QoS) services for improved content delivery. This description discloses the application of IPv6 in cable access networks to address these and other requirements.

Referring back to FIG. 1, in order to maintain backward compatibility with existing DOCSIS specifications and keep the IPv6 transition smooth, communication protocols supported by the CMs 130 and 135 and the CMTSs 120 and 125, are similar to those supported in current DOCSIS 2.0 specifications except the network layer specification is adding IPv6. In this architecture, a CMTS bridges both unicast and multicast IPv6 traffic. Multicast traffic imposes additional requirements, which are discussed in later sections. For backward compatibility with DOCSIS 2.0 and IPv4 devices, an IPv6 CMTS also provides DOCSIS 2.0 services and bridges IPv4 traffic. The router located on the upstream side of the CMTS 120 in the aggregation or core network provides IPv6 routing between one or more CMTS and the core network. Additional services collocated in the router may provide other functions like DHCP prefix delegation, as an example. Again, the edge router function may be physically collocated in the CMTS.

Referring to FIG. 1, CPE is Equipment at the subscriber's premises and may be provided by the subscriber or a service provider. These devices include CMs 130 and IP-enabled appliances that may or may not be DOCSIS-compliant. Example IP-enabled devices include IP phones, standalone Multimedia Terminal Adapters (MTAs), cell phones, printers, PCs, PDAs, gateway routers, etc. The CPE may have an embedded CM or there may be a standalone CM.

Some examples of DOCSIS-compliant CPEs include a DOCSIS-compliant CM, which is a basic standalone CM with no other functionality, an Embedded DOCSIS-compliant appliance, which is an appliance with an embedded CM, (such as a subscriber video device i.e. SVD, an MTA or a gateway), and a Standalone DOCSIS-compliant appliance such as an SVD, an MTA, or a gateway, that does not have an embedded CM but can be managed through DOCSIS.

Considering the current growth rate for broadband Internet subscribers and the introduction in the near future of new types of IP-enabled appliances such as Embedded Multimedia Terminal Adapters (MTAs) and data over cable service interface specification (DOCSIS) Set-Top Gateways (STGs), exhaustion of available IPv4 addresses is inevitable. IPv6 provides a solution to the pressing needs of managing the increasing number of customer premise devices.

IPv6 will open up broadband access channels to new Internet applications and potentially reduce operational expenses, while scaling services. Convergence of application layer functionality, e.g., DOCSIS Set-top Gateway (DSG), IPTV, VoIP, and network layer functionality, e.g., regional and national interconnects, in cable networks is driving common addressing schemes and the need for a larger address space. The extra address space offered by IPv6 can facilitate the deployment of widespread "always-on" broadband access. Cable operators can leverage this opportunity by incrementally integrating IPv6 into their operations and service portfolio. Fundamental to the successful market adoption of the new IP standard is the smooth integration and coexistence of IPv6 within the existing IPv4 infrastructures.

In developing the next generation of IP, the networking community considered some of the lessons learned from IPv4 and tried to solve some of the issues it faced. Therefore in addition to the benefits of a larger address space, there are several other features of IPv6 that presents service providers with a number of opportunities and challenges, for example, other features may include deeper hierarchy and policies for network addressing architecture flexibility, enabling efficient support for routing and route aggregation.

Additional features of IPv6 include serverless autoconfiguration, which provides for easier network renumbering and improved ready-to-use support. These features are of particular benefit to appliances and devices that should not require user configuration. IP security is also supported natively in IPv6. IPv6 also provides improved support for Mobile IP and mobile computing devices. Additional benefits include advanced multicast services due to the increased addresses, the larger number of available group addresses, and well-defined address scoping. IPv6 is also a flexible protocol with extension headers that enable it to easily adapt to unforeseen requirements. This description focuses on the cable access network as an example, but similar mechanisms can be used in other access networks as well. Although IPv6 has been around for a while, its application to a cable access network is unique and presents several challenges.

IPv6 can be employed in a cable access network to address these requirements. For example, embodiments may provide the ability to manage all the cable modems effectively using IPv6 addresses. Some embodiments may also provide the ability to classify and provide appropriate QoS to IPv6 data traffic from home devices. Additionally, embodiments may provide the ability do all of the above in a secure manner so that unauthorized IPv6 addresses are not allowed to access the network and are blocked. Other embodiments may provide the ability to interoperate with legacy IPv4 equipment where necessary and use IPv6 where available.

This disclosure describes an architecture and method for deploying IPv6 in a cable access network embodiment. Components of the architecture may include a cable edge router such as CMTS 200, a CM 300 which can operate as a bridge or a router, several in-home appliances, and various servers 110, 111 and 112 in the MSO network. Servers 110, 111 and 112 may be DNS servers, DHCP servers, TFTP servers, etc.

Figure 2:
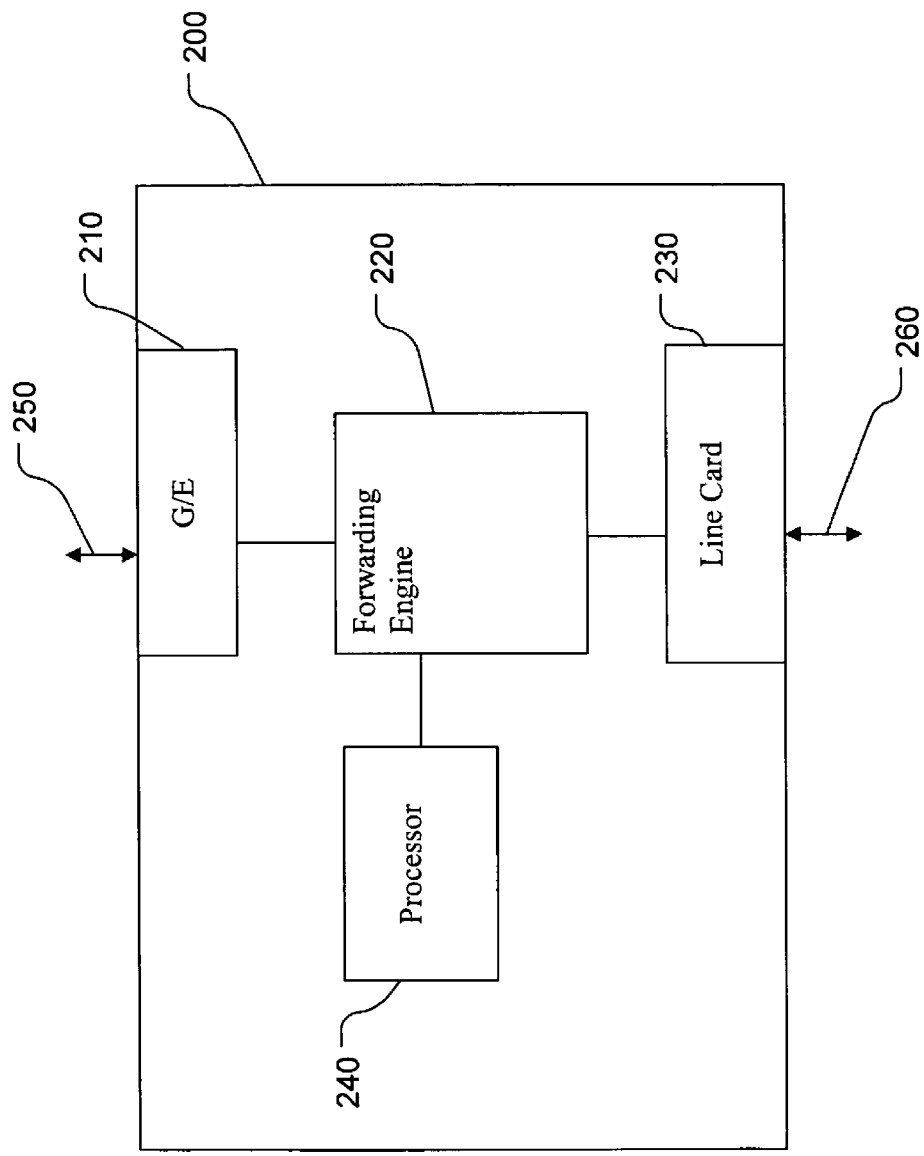
FIG. 2 illustrates an embodiment cable modem termination system.

FIG. 2 illustrates an example CMTS 200 that may be used in some embodiments. In this example, CMTS 200 is depicted as including a forwarding engine 220 coupled with a gigabit Ethernet (G/E) block 210, a processor 240, and a line card 230. CMTS 200 is a generic CMTS and may be used in place of CMTS 120 or CMTS 125 in FIG. 1, and references below discuss the generic CMTS 200 in the place of either CMTS 120 or CMTS 125 in FIG. 1 and therefore include other elements from FIG. 1. Referring to FIG. 2, CMTS 200 may be coupled to external components through other blocks than the G/E block 210 or the line card 230. Processor 240 may be a general purpose processor, as an example, and may provide a DHCP relay agent, DHCP prefix delegation functionality, etc.

In this example, while the CMTS 200 is functioning, information/signals from the network may follow a data path 250 to the G/E block 210, through the forwarding engine 220, out the linecard 230, and over a path 260, for example over an RF path as shown in FIG. 1 between HFC plant 140 and cable modem 130. Similarly, a data path originating at or behind a CM 130 may follow a reverse path through CMTS 200. A control path through CMTS 200 may come in either G/E block 210 or LC 230, and then to the forwarding engine 220, but then traverse through processor 240.

Referring to FIG. 2, CMTS 200 may include a DHCP relay agent. In an embodiment the DHCP relay agent operates in processor 240. A DHCP relay agent may provide functionality for forwarding DHCP messages between DHCP clients and DHCP servers. A DHCP relay agent in CMTS 200 may include functionality for an IP address/prefix-MAC mapping database. A CMTS 200 may maintain this database in order to authenticate a device's IPv6 address or prefix and can use it to determine whether an IPv6 address belongs to a particular Media Access Control (MAC) address.

In some embodiments, a CMTS 200 may provide for source address verification which may be used to verify an assigned address or prefix. Additionally, a CMTS 200 may provide an option for both route injection for a delegated prefix for a device and for address assignment and DHCP prefix delegation notification. Address assignment and DHCP prefix delegation notification may be used as an equivalent function to a source address verification for an access control list (ACL) to verify both assigned addresses and delegated prefixes. Some embodiments may provide pre-registration source verification of CM link local address. This functionality allows a CMTS 200 to verify a CM MAC address to IP address mapping even during the pre-registration phase.

An embodiment CMTS 200 may include Neighbor Discovery (ND) functionality. For example, CMTS 200 may function as a ND proxy. This functionality allows the CMTS 200 to respond to an ND request on behalf of another device such as personal computers 182 and 184 in FIG. 1. In a conventional DOCSIS network, two CMs 190, or two CPEs behind two different bridging CMs 130, can communicate only via a CMTS. In such situations, the embodiment CMTS 200 can respond on the CMs or CPEs behalf instead of forwarding the request to the target device. Another type of ND proxy that an embodiment CMTS 200 may provide is for duplicate address detection (DAD). This functionality allows a CMTS 200 to respond to DAD requests from a device on behalf of another device.

In an example embodiment with DAD, a message from an CM or CPE device may be examined by CMTS 200. CMTS 200 then 'reads' the message and determines the appropriate action needed in response. For example, when the message is a DAD message from a CM 130 performing initialization, the CMTS 200 can intercept the message and examine it. If the message is a DAD message, the CMTS 200 can examine a list of customer device information. If a network address in the DAD message does not already appear in the list, the CMTS 200 forwards the request to select other devices.

If there is no response, CMTS 200 can add the network address, such as an IPv6 address and MAC address for the CM 130 to its list of customer device information. If the address does appear in the list of customer device information, or some other device responds to DAD request forwarded by the CMTS 200, the CMTS 200 can respond to the CM 130, in this example by sending an acknowledgement of the address. This process may be repeated for each device as it initializes, adding its information to the list and responding directly to the device, rather than sending them out to every customer device.

In some embodiments, a CMTS 200 may provide Internet Control Message Protocol (ICMP) filtering based on ND and DAD as well as policing. Policing provides a rate limit functionality for a device. In these embodiments, the CMTS 200 can filter certain ICMP messages to provide added security and protection against various types of Denial of Service (DOS) attacks. For example, an embodiment CMTS 200 may rate limit ND messages or DAD messages from a device so that device does not overuse network resources with bogus ND or DAD messages.

In some embodiments, CMTS 200 may provision hosts with different address and prefix assignments. For example a CM 130 may be given a different prefix than a CPE 182 so that different classes of services may be used per address or prefix assignment. A CPE 182 may be given different prefixes by unicast RA, directed multicast RA, L2VPN, etc., as examples. In another example, this functionality provides for a CPE 182 behind a bridging CM 130 to be assigned addresses from two different prefixes thus providing more service control.

In an embodiment, a CMTS 200 may include functionality to show cable modem settings or states with a "show cable modem" or similar command. In addition to typical fields in a show command, some of the fields are specific to IPv6 only. For instance, a CMTS 200 may have a boot mode option to show whether a CM 130, 135 has been provisioned with IPv6 or IPv4 as its primary mode.

Show Cable Modem-like Commands for IPv6 in CMTS 200 may provide many functions. For example, a CMTS 200 with show cable modem-like commands provides for detection of a device type such as a CM Router 135 or a CPE Router behind a CM in a subscriber network. Additionally, a CMTS 200 utilizing show cable modem or similar commands may provide an intelligent CM database in the CMTS as described below. Other example functions that may be provided in show cable modem or similar commands is to detect the CM boot mode out of the possible provisioning modes, and to detect the type of IPv6 address assignment used (stateful DHCPv6 or stateless address auto-configuration). Each of these aspects are described in the following paragraphs.

When a CM connects to a CMTS 200, it sends a ranging request with its MAC address in the request. A ranging request allows a CM to align clocks with a CMTS, this is necessary since CMs may be different distances from a CMTS and therefore may otherwise be mesochronous. In response, the CMTS 200 assigns the CM a Service Identifier (SID). At this point, the CMTS 200 creates an entry in a database matching the SID with the MAC address of the CM and then tags that entry as one that belongs to a cable modem. When a packet is received at the CMTS 200 from a CM, the CMTS hardware is able to associate a SID with the received packet.

As mentioned above, a CMTS 200 with show cable modem-like commands can detect if a device is a CM Router 135. Referring now to the example embodiment in FIG. 1, if a Router Advertisement (RA) is received at CMTS 120, the CMTS 120 determines the source MAC address and the SID of the RA. RAs are described below in FIG. 4. The CMTS 120 may then reference its database to determine if that MAC address matches that of the CM 130 as determined in the ranging request. If the MAC address matches that of the CM 130, the CMTS 120 determines that the CM 130 is also a router. The CMTS then tags the CM entry as a router.

Additionally, a CMTS 200 with show cable modem-like commands may detect if a device is a CPE Router behind a CM. For example, when an RA is received at the CMTS, the CMTS determines the source MAC address and the SID of the packet. It then looks up its database to determine if that MAC address matches that of the CM. If the MAC address does not match that of the CM, the CMTS can determine that address is associated with the CPE, and can then create an entry in its data base with the MAC address and SID and tag the entry as that of a CPE router.

In another embodiment with show cable modem-like commands, a CMTS 200 may include an intelligent CM database. In this example, every packet coming upstream into a CMTS 200 may be associated with a SID. These packets are similar to an Ethernet packet and contain a source MAC address. The CMTS 200 database therefore may associate SIDs to all the MAC addresses that were the source address on any packet received on an upstream. In this example, the MAC address may also represent a device, for example a CM or a CPE, as it identifies an interface in the device. Although each interface in the device could have one or more IPv6 address, the CMTS 200 can still track all the IPv6 addresses in its database.

In this embodiment, a CM and a CPE may get their IPv6 address either through auto configuration or through DHCPv6. When the address assignment is through DHCPv6, the CMTS 200 may act as a DHCP relay agent. For example, when a CMTS 200 receives a DHCPv6 Reply that is relayed downstream on the cable interface, the CMTS 200 gleans the assigned address from the DHCPv6 message. On the other hand, when the IPv6 address is auto-configured, the device may then run a DAD, thus allowing the CMTS 200 to glean the IPv6 address of the CM/CPE from the ND Target of the DAD process.

In yet another embodiment, show cable modem-like commands may be used to detect the boot mode of a CM. In this embodiment, the CMTS 200 acts as a DHCP relay agent for both DHCPv6 and DHCPv4. In situations where the CMTS 200 first relays a DHCPv6 message, the boot mode of the CM 130 is IPv6. If the first DHCP message relayed by the CMTS 200 is an IPv4 DHCP message, the boot mode for CM 130 is IPv4.

In some embodiments, a new MAC message may be used for boot mode selection. Referring to FIG. 1 as an example, a CMTS 120 can be connected to various CMs including legacy CM 190 as well as CM 130. In this topology the CMTS 120 needs to tell the CMs which provisioning mode they need. CM modes in this context include IPv4 only, IPv6 only, IPv6 with IPv4 fallback and no dual-stack management, IPv6 with IPv4 fallback and dual-stack management, IPv4 with IPv6 fallback and no dual-stack management, and finally IPv4 with IPv6 fallback and dual-stack management. Embodiments comprising this new MAC message can therefore direct the desired provisioning mode for a CM.

In some embodiments, a CMTS 200 may also utilize downstream classifiers. Downstream classifiers may be used when the downstream traffic needs to be classified in a CMTS based on fields in the IPv6 headers, such as IPv6 addresses or flow labels. IPv6 includes a field called a flow label that enables classification of packets belonging to a specific flow. In IPv4, service flows can only be determined by analyzing the source and destination addresses in IP packets, where a flow is a sequence of related packets sent from a source to a unicast, anycast, or multicast destination. IPv6 embodiments may provide a flow label so IP addresses inside IP packets can remain encrypted and a router, such as CMTS 200, can still determine the packet flow.

For example, a CMTS 200 may use a classifier to select different service flows. The service flow then determines how the CMTS 200 queues incoming packets. An example classifier may include an IP address, a TOS field, etc. The service flow includes QoS information such as rate shaping information. In some embodiments, the DOCSIS classifier for IPv6 uses the flow label, and other IPv6 fields that allow the CMTS to more effectively queue the incoming packets. In an example, a CMTS 200 can give VoIP call flows higher priority than video or data flows.

IPv6 provides for new classification rules. For example, new classifiers for IPv6 include an IP version and a flow label. In the upstream direction a CM would implement these new classification rules and in the downstream direction the CMTS would implement these new classification rules. The IPv6 flow labels can also be used to identify IPv6 multicast flows and provide them certain QoS guarantees.

An embodiment CMTS 200 may also be able to authenticate a route injection via Routing Information Protocol (RIP). For example, since a CM in routing mode is an untrusted device, a CMTS 200 should make sure that the route being advertised by the CM is valid before the CMTS 200 installs the route in its routing tables.

Another mechanism for route injection is for a DHCP server to communicate the route for a delegated IPv6 prefix to a CMTS. In this embodiment, CMTS 200 may be able to learn about delegated IPv6 prefixes and perform route injection for the delegated prefix through a message sent from the DHCP server to the CMTS. For example, when the DHCP server sends a delegate prefix to CM 135, the DHCP server can send an additional message to CMTS 200 to inform the CMTS of the delegated prefix.

An embodiment IPv6 capable CMTS 200 may also provide a mobile IPv6 Home Agent (HA). Referring to FIG. 1, an embodiment with Mobile IPv6 (MIPv6) enables a wireless device, mobile agent or terminal 195 to maintain IP connectivity as it moves across networks and different access technologies. In addition, Mobile IPv6 provides route optimization techniques to reduce handoff latencies. In these embodiments, if MSOs support mobility by providing a HA, the anchor point can reside in any of a CM/CPE router 130, a CMTS 120 or other edge router, or in a core network or multiple service specific locations depending on deployment preference. The decision to position any given HA is based on various factors, including access network design, provisioning required, or management alignment with the specific application or service, etc.

Example embodiments of a MIPv6 HA may reside in a CM Router 130. Integration of MIPv6 HA into CM Router 130 enables deployment of mobile IP services. For example, integration of MIPv6 HA in CM Router 130 provides a handoff scheme allowing cell phones to switch from a cellular tower connection to a DOCSIS connection if the user were making the call while at home. Another example embodiment allows a customer to take a Personal Digital Assistant (PDA) to an offsite location, such as a coffee shop, and have MIPv6 keep the PDA logically connected to their home network.

An embodiment CMTS 200 integrating a MIPv6 HA provides additional functionality. For example, these embodiments may provide Load balancing in downstream traffic where each downstream has a distinct IP subnet. In conventional IPv4 and IPv6, connections break when CMs move across downstreams (i.e. across subnets), unless you're using an interface bundling feature. A MIPv6 embodiment glues connections and ensures continuous connections even when CMs move across subnets. For example, when a CM moves from a first downstream (subnet 1) to another downstream (subnet 2), MIPv6 can ensure seamless networking.

Figure 3:
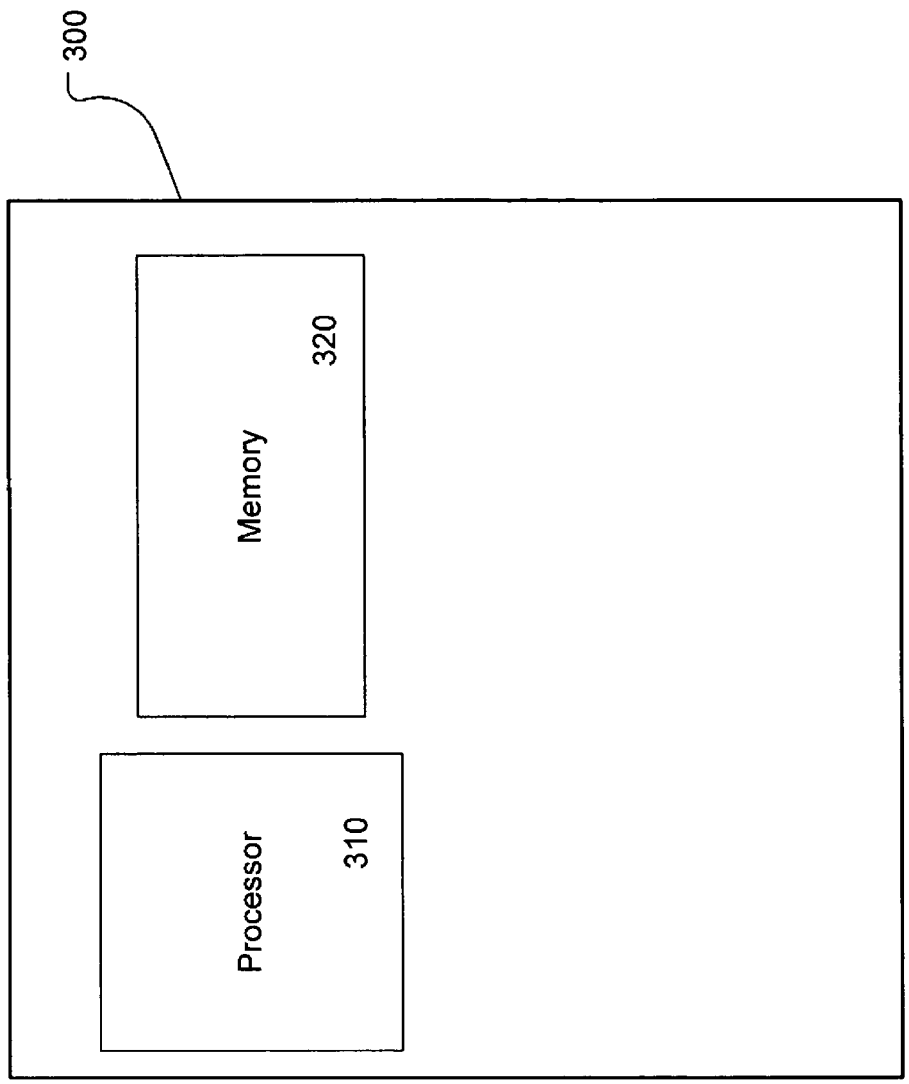
FIG. 3 illustrates an embodiment cable modem.

FIG. 3 illustrates an embodiment cable modem 300. This example CM 300 includes a processor 310 and memory 320 and typically includes hardware for coupling to an RF network operated by an MSO as well as an Ethernet port for communications in a local network. The memory 320 may include instructions that, when executed by the processor 310, perform the functions described in the FIG. 8 flow diagram. CM 300 may operate in different modes. Two example modes include as a bridge such as CM 130 in FIG. 1, and as a router like CM 135 in FIG. 1.

Adaptation of IPv6 in the cable environment poses challenges for CMs 300. For example, in an IPv6 environment a CM 300 may need to detect if it is connected to a IPv6-capable CMTS 200 and then determine if it should boot up in IPv6 or IPv4 (legacy) mode. As described above with reference to the CMTS, some embodiments may provide a layer 2 based signaling mechanism between a CMTS 200 and a CM 300 to facilitate boot mode selection for the CM 300. Additionally, if the CM 300 boots up in IPv6 mode and fails to complete the provisioning process, the CM 300 should fallback to a default mode of provisioning (IPv4).

In some embodiments, a CM 300 may need a mechanism to acquire multiple addresses and prefixes for cable modems and home appliances. This may be accomplished by using a DHCPv6 configuration, a stateless auto configuration, or even both. However, if a home appliance or CM 300 has acquired an address via auto configuration, it still needs a way to register its address back to the MSO network for DNS and other services to work. Embodiments in the following paragraphs disclose ways to overcome these challenges.

Since CM 300 can operate as either a bridge or a router, IPv6 provides a separate but overlapping functionality for either operation mode. When the CM operates as a bridge, for example CM 130 in FIG. 1, the CM 130 may provide IPv6 support for Integrated Routing and Bridging (IRB): In this embodiment the CM 130 may process as well as bridge some L3 control traffic from the CMTS 120. For example, CM 130 may need to process or bridge RA messages from CMTS 120. This can be achieved using the IRB functionality. Note that this is different from a standard bridge functionality which does not do any L3 processing of packets.

In bridged CM embodiments, the CM 130 may use new MAC messages for CM boot mode selection in complementary fashion to the CMTS in FIG. 2 using these new MAC messages for CM boot mode selection. In these embodiments, the new MAC message from the CMTS 120 informs the CM 130 which provisioning mode it should use. Therefore, embodiment bridged CMs may need to decode and process the MAC message and then self configure with appropriate provisioning parameters.

Additionally, some bridged CM embodiments may use upstream classifiers and filters for IPv4 and IPv6. For example, a bridged CM 130 may map IPv6 flow labels to service flows in the upstream direction. Then the flow labels can assigned by the end device and used as a mechanism to classify the upstream traffic into different service flows at the CM 130.

In embodiments were the CM is a router, such as CM 135 in FIG. 1, different functionality may be provided. For example, a routed CM 135 may provide functionality for Internet Group Management Protocol version 3 (IGMPv3) and Multicast Listener Discovery Version 2 (MLDv2) for IPv6 proxy routing. In IGMPv3 MLDv2 proxy routing, the CM 135 router needs to interact with CPE devices at home and process the IGMPv3 and MLDv2 packets.

IGMP is a multicast communications protocol used to manage the membership of IP groups. IGMP is used by IP hosts and adjacent multicast routers to establish multicast group memberships and is integral to the IP multicast specification similar to ICMP for unicast connections. MLD is the IPv6 equivalent of IGMP in IPv4, therefore it effectively supports IPv6 multicast applications across DOCSIS. MLDv2 is identical to IGMPv3, both of which are necessary to support not only Any Source Multicast (ASM), but also Source Specific Multicast (SSM) model for each respective version of IP.

Some embodiments may support MLDv2 with a set of Dynamic Service Addition (DSA) message extensions and CMTS procedures, thus limiting the additional complexity in CMs. This proposed approach also integrates well with the baseline privacy interface plus (BPI+) functionality in DOCSIS. MLDv2 support can also be provided for via MLDv2 snooping in CMs, as another example.

In additional embodiments, a routed CM 135 supports QoS functionality between IP and DOCSIS. In these embodiments, the CM 135 can perform two levels of QoS on upstream packets to the CMTS 125. Therefore CM 135 can apply IP QoS at the first level and then feed the upstream packets to a DOCSIS L2 QoS engine which does service flow level QoS.

Some embodiments can transfer DNS servers, domain search list, Network Time Protocol (NTP) servers, TOD servers, etc., from an RF interface of a CM to an Ethernet interface of the CM. In these embodiments, when a DHCPv6 client on the RF side of the CM obtains configuration parameters, it needs to pass it to the DHCPv6 server running on the Ethernet side. This information may then be stored on the server and handed to CPEs in the home network during their provisioning process.

In some embodiments, a routed CM 135 supports hierarchical prefix subdelegation from the RF interface of CM 135 to the Ethernet interface. In commercial deployments, there are typically more routers behind a CM 135 within the customer network 185. These routers may be in different administrative domains than the CM 135, which is managed by the MSO. In these situations, the MSO managed CM 135 can get its prefix from the MSO and then delegate prefixes to the routers in the customer network 185.

Some embodiments may provide stateless auto configuration with directed IPv6 Prefix/Address assignments for classes of devices. Conventionally an IP address assigned to a CM 300 is mainly used for management purposes and is assigned from an MSO's private pool of addresses. In an IPv4/6 environment, a CM 300 can continue to use DHCPv4 to obtain IPv4 address for management purposes. This would leave the operational infrastructure unchanged for MSOs. Optionally, if the MSO wants to fully migrate to IPv6, they can also use IPv6 addressing for CMs.

As more devices are added to a DOCSIS control network, MSOs may need to assign separate prefixes to each type of device for management purposes and get desired prefixes/addresses in these devices when they come on-line. There needs to be an option for a subset of devices to fetch a new configuration upon receiving new IPv6 prefix/addresses. Currently, MSOs use an inefficient SNMP-based methods for this purpose. An embodiment may use multicasting functionality in IPv6 for configuration purposes.

For example refer to FIG. 1, in an embodiment a CM 130 can use DHCPv6 to request a prefix from which it should assign an address to its HFC interface. A DHCPv6 server 110 identifies the CM 130 and provides it with the appropriate prefix in a DHCPv6 response. Additionally, the CM 130 can use DHCPv6 for assignment of an address to its HFC interface. In this regard, the DHCPv6 server 110 identifies the CM 130 and assigns it the appropriate address in a DHCPv6 response.

In either case, the CM 130 can be informed of its DOCSIS configuration file, and the address of the server from which the configuration file should be downloaded, along with the prefix or address. In some embodiments, a CPE can act as a gateway router and therefore can use DHCPv6 prefix delegation to obtain a prefix to be used to assign addresses to devices attached to the customer network.

Figure 4:
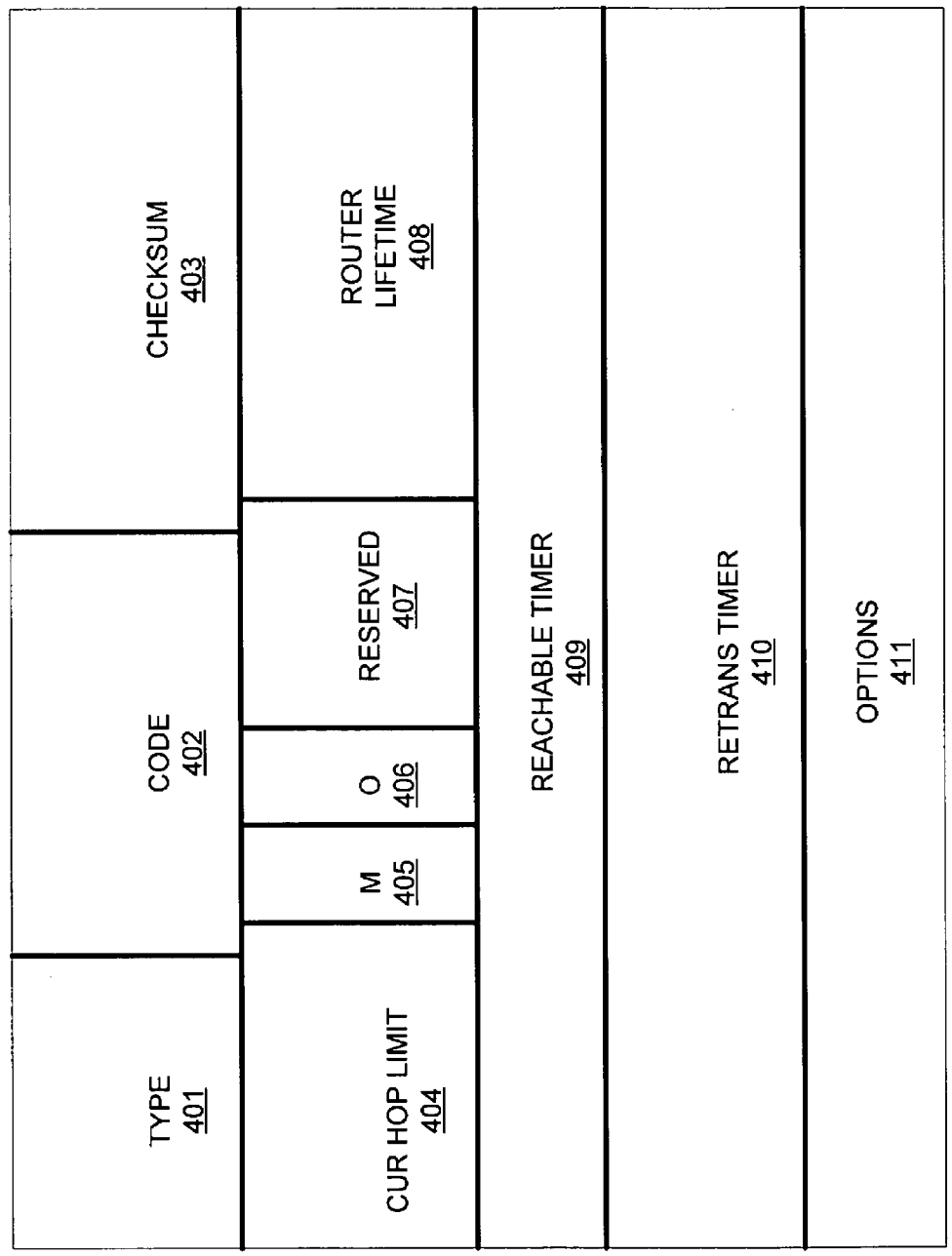
FIG. 4 illustrates a router advertisement as may be used in embodiments of the invention.

FIG. 4 illustrates a router advertisement 400 according to RFC 2461, which is herein incorporated by reference, and is publicly available. RFC 2461 references ICMPv6 according to RFC 2463 also incorporated by reference and publicly available.

Referring to FIG. 4, the Type 401 and Code 402 fields indicate the type of the message. The values assigned to these fields determine the format of the remaining data. The Checksum 403 is used to detect data corruption in the router advertisement 400.

The Cur Hop Limit 404 is an 8-bit value. This 8-bit value may be placed in the Hop Count field of an IP header. M 405 is a 1-bit managed address configuration flag. O 406 is a 1-bit non-address stateful configuration flag. Setting M 405 and O 406 causes hosts to use stateful configuration. Setting O 406 and not M 405 causes hosts to use stateless DHCP for non-address information. Not setting M 405 or O 406 results in no DHCP for establishing an address or other configuration information. Reserved 407 is a 6-bit unused field. Router Lifetime 408 is a 16-bit value that represents the lifetime associated with the default router in units of seconds. Router Lifetime 408 reflects the router's usefulness as a default router.

Reachable Time 409 is a 32-bit value that represents, in milliseconds, the time that a node assumes a neighbor is reachable after having received a reachable confirmation. Retrans Timer 410 is a 32-bit value that represents, in milliseconds, the time between retransmitted neighbor solicitation messages.

The Options field 411 may include many different fields. In one example, the Options field 411 may include a layer 2 source address for the device sending the Router Advertisement. In another example, the Options field 411 may include prefix information such as a management prefix or a service prefix. Multiple options fields may contain prefix advertisements and a bit in the field, such as the first bit, may instruct to do a stateless auto configuration using the prefix in that field, for example if the bit is 1, and not do stateless auto configuration on that prefix if the bit is 0.

Referring back to FIG. 1, servers 110, 111 or 112 may be a dynamic IP address management system that conventionally uses DHCP to assign IP addresses to cable interfaces, PCs, and other devices on the broadband network. These servers may also include script extensions that allow a cable system administrator to define and view individual DHCP options that may also be used by a CMTS or a CM, define the identity or type of device on the network, and assign the device to a predefined class or group. With the introduction of IPv6 to access networks, in this example a cable access network, cable system administrators may assign and control new options using an embodiment server.

Figure 5:
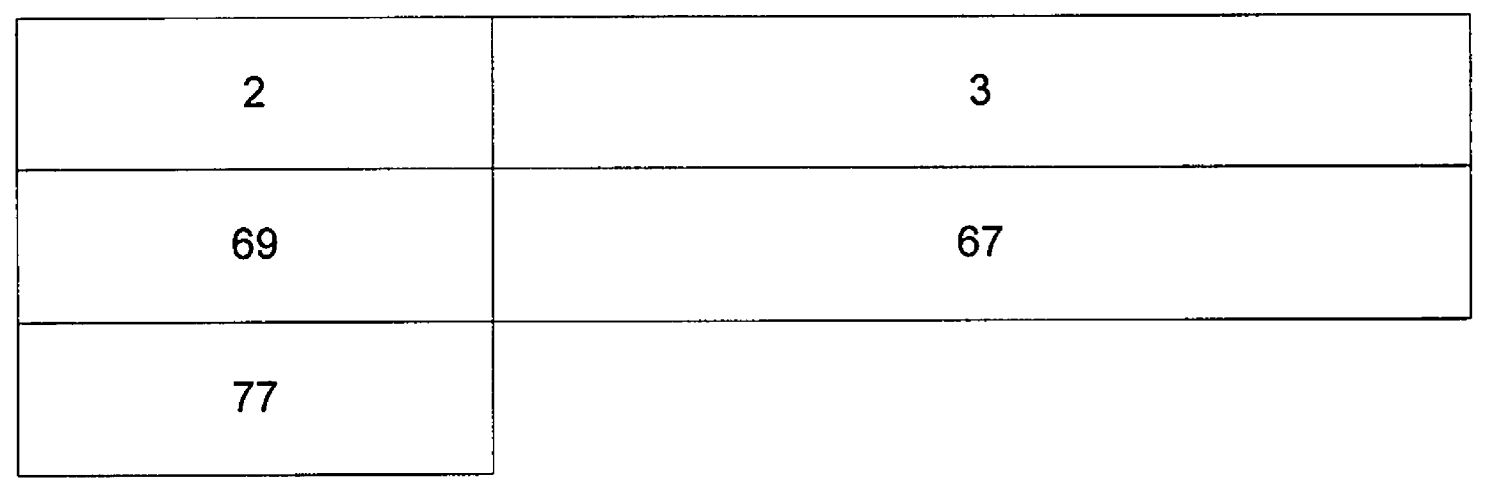

As an example, supported DHCP Vendor Specific Information sub-options used by eDOCSIS are in the range 1-10. A sub-option begins with a 16-bit tag value containing the sub-option code, followed by a 16-bit length value indicating the total number of octets of data. The length value does not include either the sub-option code or the length value. The length value is followed by length octets of data. FIG. 5 illustrates an example DHCP sub-option 2 where 69, 67 and 77 are the decimal values for the ASCII encoding for "ECM", designating an embedded cable modem.

Figure 6:
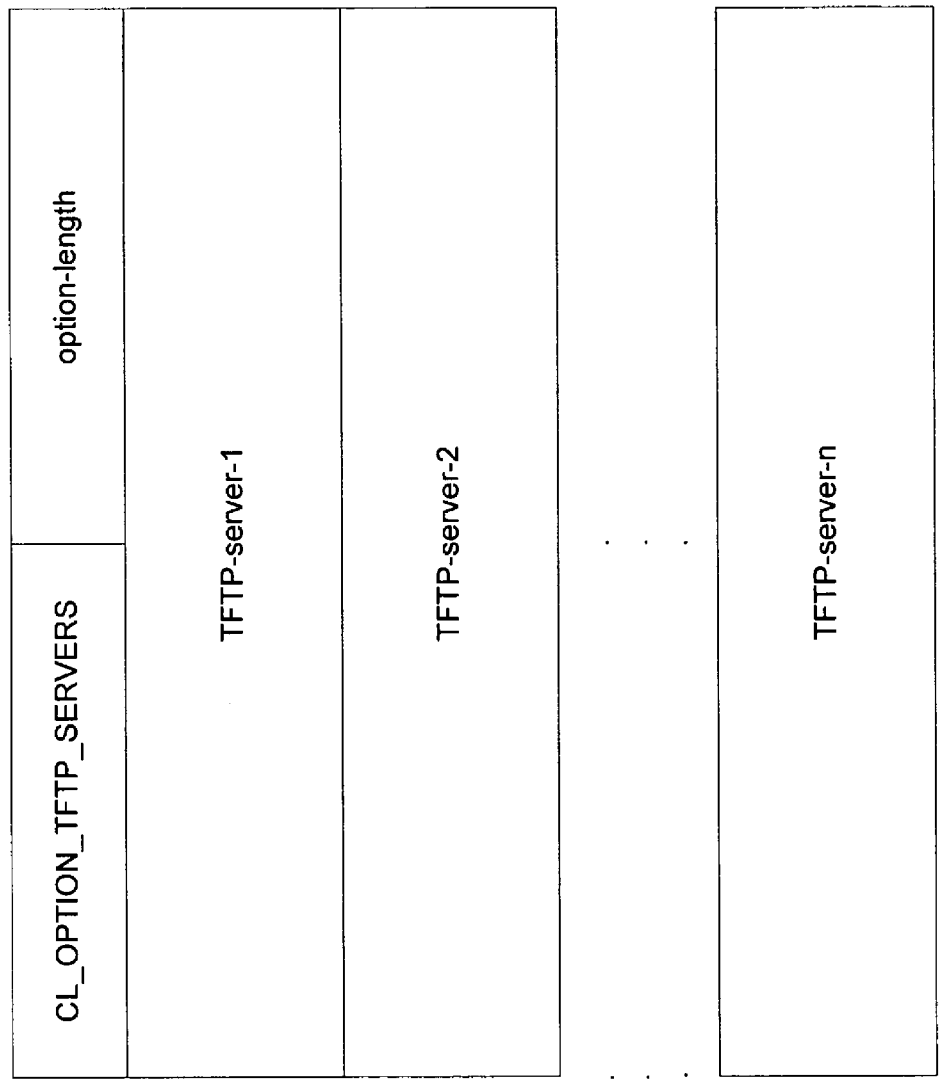
FIG. 6 illustrates an example TFTP server addresses option as may be used in an embodiment.

FIG. 6 illustrates an example TFTP server addresses option as may be used in an embodiment. Referring to FIG. 6, a TFTP Server Addresses option contains the IPv6 addresses of TFTP servers from which a client obtains its DOCSIS configuration file. The TFTP server addresses are listed in order of preference, and the client attempts to obtain its configuration file from the TFTP servers in the order in which they appear in the option. The format of the TFTP Server Addresses option is represented in FIG. 6. The option code for this option is in the top left field and is CL_OPTION_T-FTP_SERVERS (TBD). The option length may be set to 16*n (for n servers in the option). The fields in the figure that are illustrated with "TFTP-server" include the IPv6 address of the respective TFTP server. This new option provides multiple TFTP servers where a client can get its DOCSIS configuration file. In IPv4, there were no server alternatives in this manner.

Figure 7:
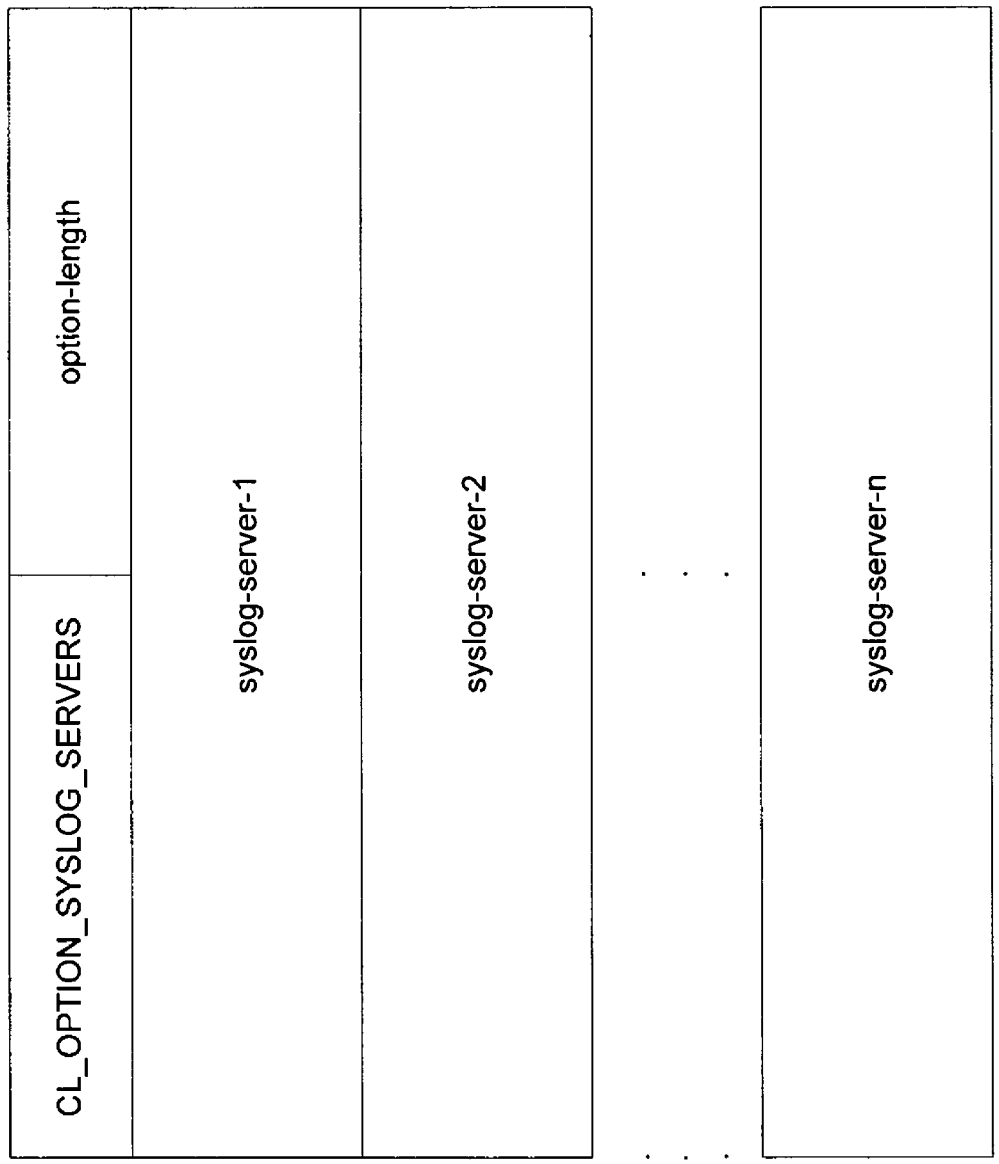
FIG. 7 illustrates a syslog server addresses option as may be used in an embodiment.

FIG. 7 illustrates a syslog server addresses option as may be used in an embodiment. Syslog is a standard for forwarding log messages in an IP network, for example for computer system management and security auditing. Referring to FIG. 7, the Syslog Server Addresses option contains the IPv6 addresses of the syslog protocol servers the client uses for syslog messages. The Syslog server addresses are listed in order of preference, and the client uses the Syslog servers in the order in which they appear in the option.

The format of the Syslog Server Addresses option are represented in FIG. 7. This option code is in the top left field and is currently CL_OPTION_SYSLOG_SERVERS. Similar to the TFTP server addresses option, the option length for a syslog server addresses option may be set to 16*n for n servers in the option. The fields in the figure that are illustrated with "syslog-server" include the IPv6 address of the respective syslog server. Syslog in DHCPv4 uses a generic logging server under option code 7.

Figure 8:
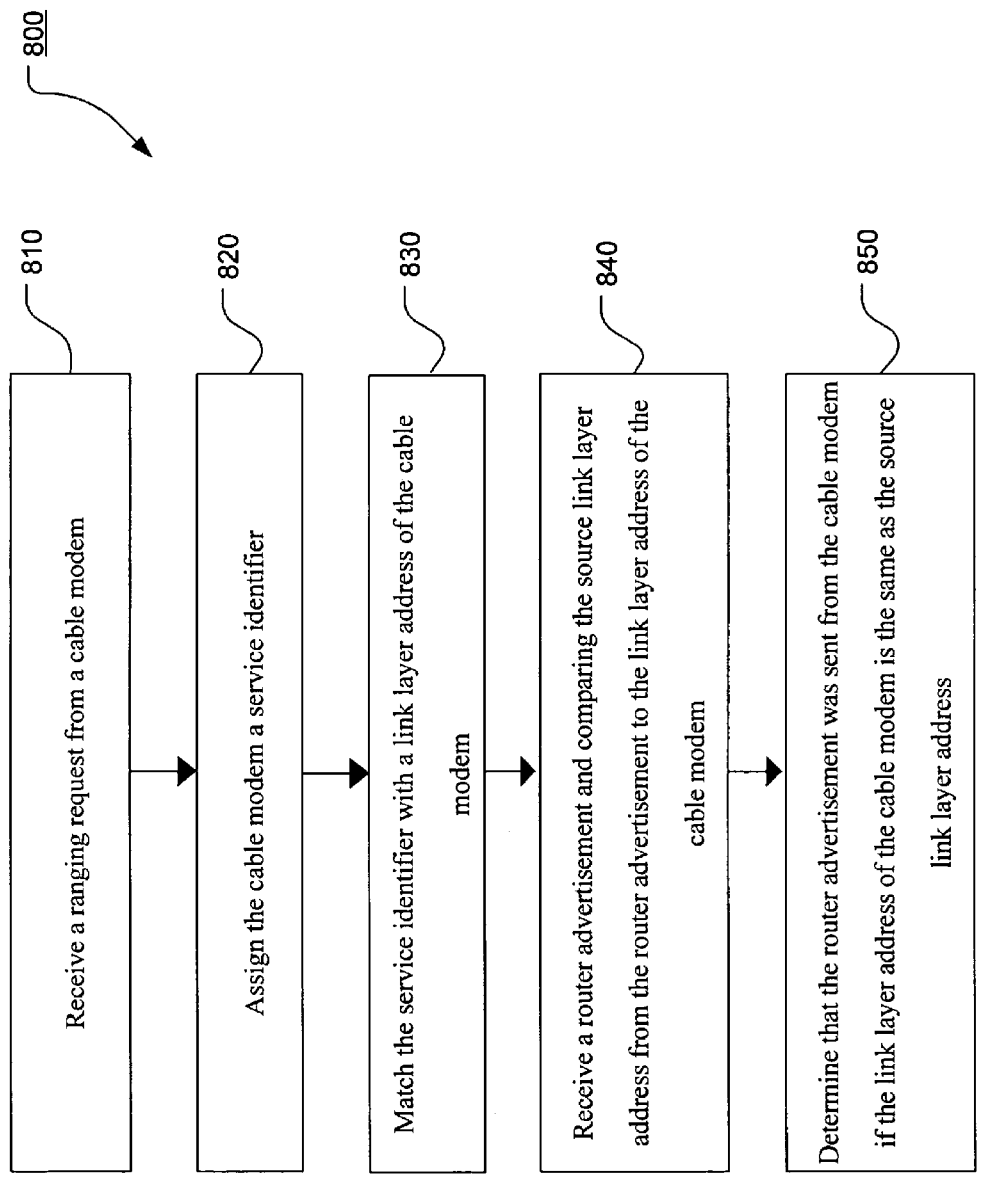
FIG. 8 is a flow diagram representing an embodiment method.

FIG. 8 is a flow diagram representing an embodiment method 800 including receiving a ranging request from a cable modem in block 810, assigning the cable modem a service identifier in block 820, matching the service identifier with a link layer address of the cable modem in block 830, in block 840 receiving a router advertisement and comparing the source link layer address from the router advertisement to the link layer address of the cable modem, and in block 850 determining that the router advertisement was sent from the cable modem if the link layer address of the cable modem is the same as the source link layer address.

Figure 9:
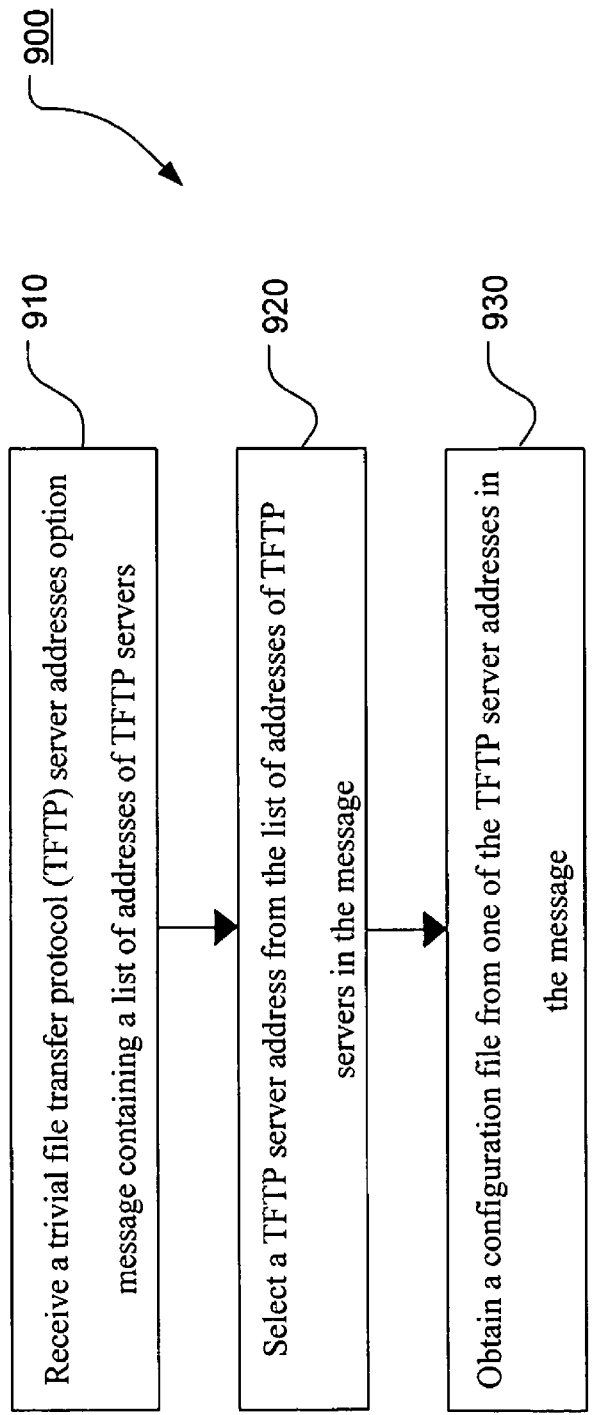
FIG. 9 is a flow diagram representing an embodiment method.

FIG. 9 is a flow diagram representing an embodiment method 900 including establishing a link layer connection to an access server in block 910, obtaining a management address, wherein the management address is at least one of an IPv6 and an IPv4 address in block 920, in block 930 obtaining a TFTP server address, wherein the server address is either IPv6 or IPv4, in block 940 downloading a configuration file from the TFTP server; and in block 950 registering with the access server as IPv6 capable.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method comprising:
   detecting a connection to a cable modem termination system (CMTS);
   determining whether the CMTS is IPv6-capable;
   booting up in one of "IPv6 only mode" and "IPv6 with IPv4 fallback mode" responsive to a determination that the CMTS is IPv6-capable;
   booting up in IPv4 mode responsive to a determination that the CMTS is not IPv6-capable;
   establishing a link layer connection to an access server;
   obtaining a management address, wherein the management address is at least one of an IPv6 and an IPv4 address;
   obtaining a TFTP server address, wherein the server address is either IPv6 or IPv4;
   downloading a configuration file from the TFTP server;
   registering with the access server as IPv6 capable;
   maintaining an IP address/prefix-MAC mapping database; and
   determining whether the IPv6 address belongs to a particular media access control (MAC) address based on the IP address/prefix-MAC mapping database.

2. The method of claim 1 further comprising requesting a prefix from which to assign an address to an upstream interface.

3. The method of claim 2 wherein the prefix is requested with dynamic host configuration protocol version 6 (DHCPv6).

4. The method of claim 2 further comprising using DHCPv6 prefix delegation to obtain a prefix to be used to assign addresses to attached devices.

5. The method of claim 1, the obtaining a TFTP server address, wherein the server address is either IPv6 or IPv4 further comprising:
   receiving a trivial file transfer protocol (TFTP) server addresses option message containing a list of addresses of TFTP servers;
   selecting a TFTP server address from the list of addresses of TFTP servers in the message; and
   obtaining a configuration file from one of the TFTP server addresses in the message.

6. An apparatus comprising:
   a port to communicate over a link layer connection to an access server;
   a processor coupled with the port, the processor to communicate through the port with the access server and obtain at least one of an IPv6 or IPv4 management address, the processor further to obtain at least one of an IPv6 or IPv4 TFTP server address from the access server, awl the processor to download a configuration file through the port from the TFTP server and register through the port with the access server as IPv6 capable, and the processor to provide a DHCP relay agent for maintaining an IP address/prefix-MAC mapping database and, responsive to the processor obtaining an IPv6 management address, determining whether the IPv6 management address belongs to a particular media access control (MAC) address based on the IP address/prefix-MAC mapping database.

7. The apparatus of claim 6 further comprising the processor to request a prefix from which to assign an address to an upstream interface.

8. The apparatus of claim 7 wherein the prefix is requested with dynamic host configuration protocol version 6 (DHCPv6).

9. The apparatus of claim 7 further comprising the processor to use DHCPv6 prefix delegation to obtain a prefix to assign addresses to attached devices.

10. The apparatus of claim 6 further comprising the port to receive a trivial file transfer protocol (TFTP) server addresses option message containing a list of addresses of TFTP servers, and the processor to select a TFTP server address from the list of addresses of TFTP servers in the message and obtain a configuration file through the port from one of the TFTP server addresses in the message.

11. A cable modem termination system (CMTS) comprising:
 a port to receive configuration information from a cable modem;
 a memory in communication with the port, the memory to store the cable modem configuration information; and
 a processor in communication with the port and the memory, the processor to access the configuration information, determine at least one cable modem setting from the configuration information, output the at least one cable modem setting, provide a DHCP relay agent for maintaining an IP address/prefix-MAC mapping database, and determine whether an IPv6 address belongs to a particular media access control (MAC) address based on the IP address/prefix-MAC mapping database.

12. The method of claim 1 further comprising falling back to a default mode of IPv4 responsive to a failure to complete a provisioning process subsequent to booting up in IPv6 mode.

13. The method of claim 1 further comprising the CMTS responding to a neighbor discovery (ND) request on behalf of a network device.

14. The method of claim 13 further comprising the CMTS policing ND messages by providing a rate limit for ND requests.

15. The method of claim 1 further comprising the CMTS responding to a duplicate address detection (DAD) request on behalf of a network device.

16. The method of claim 15 further comprising the CMTS adding a network address in the DAD request to a list of CMTS customer device information responsive to determining that the network address does not appear in the list of CMTS customer device information.

17. The method of claim 15 further comprising the CMTS sending an acknowledgment of the network address to the network device responsive to determining that the network address appears in the list of CMTS customer device information.

18. The method of claim 15 further comprising the CMTS policing DAD messages by providing a rate limit for DAD requests.

19. The apparatus of claim 6 wherein the DHCP relay agent is configured to forward messages between DHCP clients and DHCP servers.

20. The CMTS of claim 11 wherein the DHCP relay agent is configured to forward messages between DHCP clients and DHCP servers.

* * * * *

UNITED STATES PATENT AND TRADEMARK OFFICE
CERTIFICATE OF CORRECTION

PATENT NO. : 7,941,512 B2
APPLICATION NO. : 11/302966
DATED : May 10, 2011
INVENTOR(S) : Ralph E. Droms et al.

It is certified that error appears in the above-identified patent and that said Letters Patent is hereby corrected as shown below:

Column 14, line 55, please delete the word "awl".

Signed and Sealed this
Twenty-eighth Day of February, 2012

David J. Kappos
*Director of the United States Patent and Trademark Office*